United States Patent

Coleman et al.

Patent Number: 5,765,537
Date of Patent: Jun. 16, 1998

[54] FUEL RECIRCULATION SYSTEM

[75] Inventors: Gerald N. Coleman, Peoria; James E. Sibley, Metamora, both of Ill.

[73] Assignee: Caterpillar Inc., Peoria, Ill.

[21] Appl. No.: 785,621

[22] Filed: Jan. 17, 1997

[51] Int. Cl.$^6$ ............................................ F02M 37/04
[52] U.S. Cl. ............................................ 123/514
[58] Field of Search ........................... 123/514, 510, 123/25 E, 25 C, 25 R, 575

[56] References Cited

U.S. PATENT DOCUMENTS

| | | | |
|---|---|---|---|
| 2,599,699 | 6/1952 | Dilworth et al. | 158/36.3 |
| 4,136,652 | 1/1979 | Lee | 123/136 |
| 4,273,078 | 6/1981 | Cottel | 123/25 C |
| 4,411,239 | 10/1983 | Kelch | 123/557 |
| 4,416,225 | 11/1983 | Constantine | 123/25 E |
| 4,625,701 | 12/1986 | Bartlett et al. | 123/514 |
| 4,726,335 | 2/1988 | Brauninger | 123/198 |
| 4,989,572 | 2/1991 | Giacomazzi et al. | 123/514 |
| 5,018,502 | 5/1991 | Humpl et al. | 123/514 |
| 5,111,844 | 5/1992 | Emmert et al. | 137/567 |
| 5,207,203 | 5/1993 | Wagner et al. | 123/514 |
| 5,237,978 | 8/1993 | Bailey | 123/515 |
| 5,243,932 | 9/1993 | Herrman | 123/575 |
| 5,263,456 | 11/1993 | Owen-Evans | 123/495 |
| 5,269,276 | 12/1993 | Brown | 123/514 |
| 5,285,759 | 2/1994 | Terada et al. | 123/514 |
| 5,339,787 | 8/1994 | Jungquist et al. | 123/514 |
| 5,373,829 | 12/1994 | Schuers et al. | 123/514 |
| 5,404,841 | 4/1995 | Valentine | 123/25 E |
| 5,425,342 | 6/1995 | Ariga et al. | 123/514 |
| 5,469,830 | 11/1995 | Gonzalez | 123/515 |

Primary Examiner—Thomas N. Moulis
Attorney, Agent, or Firm—Robert J. Hampsch

[57] ABSTRACT

A fuel recirculation system is provided that includes a fuel tank, a fuel delivery circuit for transporting fuel between the fuel tank and an internal combustion engine, a fuel recirculation circuit coupled with the fuel delivery circuit upstream of the engine and adapted for recirculating the fuel back to the fuel tank periodically. The present fuel recirculation system also includes a fuel pump, the capacity of which is sufficient to supply the required fuel to the engine via the fuel delivery circuit and recirculate the remaining volume of fuel by way of the fuel recirculation circuit periodically (e.g. once every 24 hours).

18 Claims, 1 Drawing Sheet

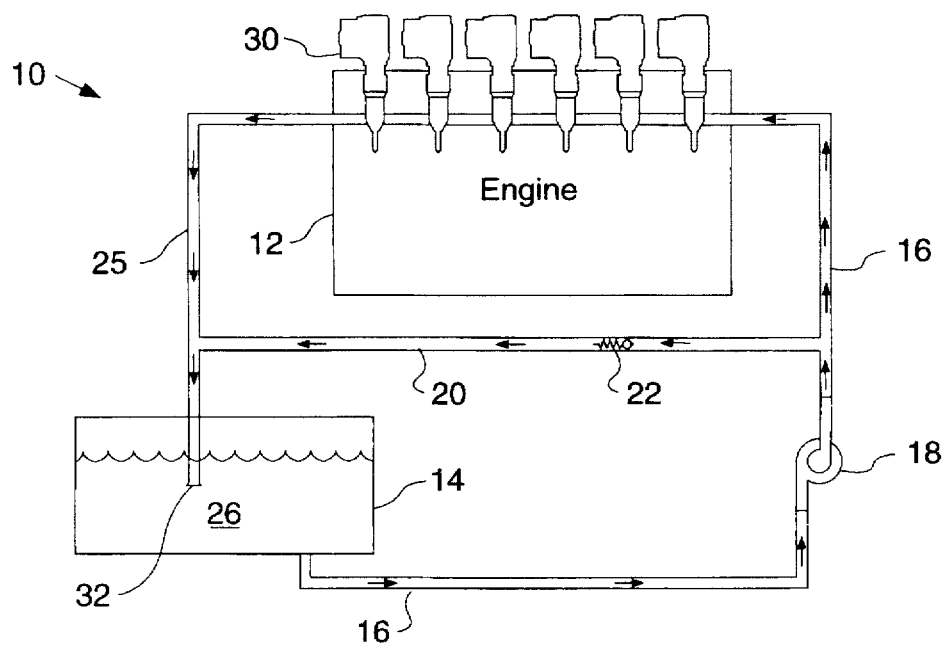
Fig-1-
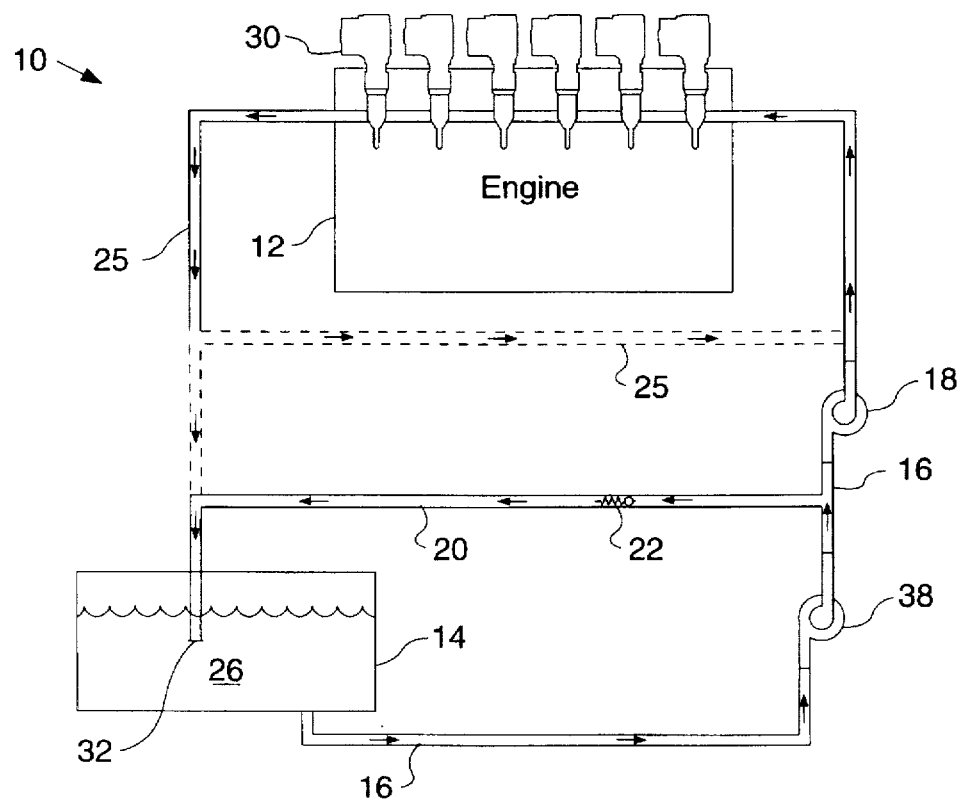
Fig-2-

FUEL RECIRCULATION SYSTEM

FIELD OF THE INVENTION

The present invention relates to a fuel recirculation system for an internal combustion engine and more particularly, to a fuel recirculation system for an internal combustion engine that utilizes an aqueous fuel emulsion as a source of fuel.

BACKGROUND

Recent fuel developments have resulted in a number of aqueous fuel emulsions comprised essentially of a carbon based fuel, water, and various additives such as lubricants, emulsifiers, surfactants, corrosion inhibitors, cetane improvers, and the like. It is the additives that act to couple the water molecules with the carbon based fuel without separation. These aqueous fuel emulsions may play a key role in finding a cost-effective way for internal combustion engines including, but not limited to, compression ignition engines (i.e. diesel engines) to achieve the reduction in emissions below the mandated levels without significant modifications to the engines, fuel systems, or existing fuel delivery infrastructure.

Aqueous fuel emulsions, however, have a tendency to separate over time into a water phase and a fuel phase. When separation occurs, the water phase develops near the bottom of the fuel reservoir whereas the fuel phase tends to develop above the water phase. The problems associated with fuel separation are very severe inasmuch as most engine operating characteristics are adjusted for a prescribed fuel composition. Where the fuel composition has changed through separation, the engine performance is markedly diminished.

Several related art devices and techniques for recirculating fuel for the purposes of maintaining fuel consistency or controlling fuel temperature have been devised. For example, U.S. Pat. No. 5,263,456 (Owen-Evans) discloses a fuel flow arrangement for recirculating excess fuel from an engine back to the fuel tank or alternatively back to the fuel feed line, if necessary, to increase the fuel temperature fed to the engine. The fuel flow arrangement employs a fuel feed line, fuel transfer pump, fuel injection pump, fuel return line and bypass passage, but does not address the need to recirculate the fuel in the tank for the purposes of preventing fuel emulsion separation. See also U.S. Pat. No. 2,599,699 (Dilworth) which discloses a similar fuel flow arrangement for the purposes of increasing the fuel temperature fed to the engine.

Another related art system particularly adapted for temperature control of the fuel in a diesel engine is disclosed in U.S. Pat. No. 4,411,239 (Kelch). The disclosed system includes two separate fuel circuits including a fuel injection circuit adapted to feed fuel to the engine and a fuel cooling circuit adapted to recirculate the fuel in the tank to cool the fuel in the fuel injection circuit. The two separate circuits both feed into a heat exchanger for the purposes of cooling the fuel in the fuel injection circuit using the low temperature fuel from the fuel tank.

Another related art fuel delivery system designed to prevent separation of a fuel mixture (e.g. gasoline/alcohol) is disclosed in U.S. Pat. No. 4,136,652 (Lee). The disclosed fuel delivery system includes a fuel pump disposed within the fuel tank and adapted for delivering fuel from the fuel tank to a fuel feed device on the engine via a fuel line as well as recirculate a portion of the fuel in the fuel line back to the bottom of the tank.

SUMMARY OF THE INVENTION

The present invention addresses some of the above-identified concerns by providing a method and system for recirculating fuel of an internal combustion engine adapted to use an aqueous fuel emulsion to prevent separation of the aqueous fuel emulsion.

In a broad sense, the invention may be characterized as a fuel recirculation system that includes a fuel tank, a fuel delivery circuit for transporting fuel between the fuel tank and an internal combustion engine, a fuel recirculation circuit coupled with the fuel delivery circuit upstream of the engine and adapted for recirculating the fuel back to the fuel tank periodically. The present fuel recirculation system also includes a fuel pump for circulating the fuel through the fuel delivery circuit as well as through the recirculation circuit. In the disclosed embodiments, the capacity or output of the pump is generally equivalent to at least 1/24 of the volume of the tank per hour or such capacity sufficient to supply the required fuel to the engine via the fuel delivery circuit and recirculate the remaining volume of fuel by way of the fuel recirculation circuit once every 24 hours.

The fuel recirculation circuit preferably includes a check valve which is used to regulate the fuel flow through the fuel recirculation system. Any fuel exiting to the fuel tank is preferably extracted from lower elevation of said fuel tank whereas fuel returned to the fuel tank is preferably introduced to a central elevation of the fuel tank to reduce the aeration of the recirculated fuel.

BRIEF DESCRIPTION OF THE DRAWINGS

The above and other aspects, features, and advantages of the present invention will be more apparent from the following, more descriptive description thereof, presented in conjunction with the following drawings, wherein:

FIG. 1 is a schematic representation of an embodiment of the fuel recirculation system for an internal combustion engine adapted to use an aqueous fuel emulsion; and FIG. 2 is a schematic representation of another embodiment of the fuel recirculation system for an internal combustion engine adapted to use an aqueous fuel emulsion.

Corresponding reference numbers indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principals of the invention. The scope of the invention should be determined with reference to the claims.

Turning now to the drawings and particularly to FIG. 1, there is shown an embodiment of the fuel recirculation system 10 for use with an internal combustion engine 12. As seen therein the fuel recirculation system 10 includes a fuel tank 14, a fuel feed line 16, an engine transfer pump 18, a fuel recirculation bypass conduit 20, a fuel recirculation check valve 22, and a fuel return conduit 25.

The fuel 26 residing within the fuel tank 14 is transported via the fuel feed line 16 to the engine transfer pump 18 and on to the engine 12. As is common in many fuel delivery systems, the fuel 26 from the fuel tank 14 is preferably delivered from the lower or bottom elevation of the fuel tank 14. The engine 12 preferably includes a fuel delivery device such as a plurality of fuel injectors 30 adapted to provide a prescribed volume of fuel 26 to the engine cylinders for combustion. Any excess fuel 26 not injected by the fuel injectors 30 into the engine cylinders is returned via a fuel return conduit 25 to the fuel tank 14. In addition, the fuel feed line 16 and the fuel return conduit 25 are coupled together in fluid communication via the fuel recirculation bypass conduit 20 and under the control of the fuel recirculation check valve 22. In the illustrated embodiment, both the fuel recirculation bypass conduit 20 and the fuel recirculation check valve 22 are located downstream of the engine transfer pump 18.

In this disclosed embodiment, the engine transfer pump 18 is oversized in order to pump excess fuel 26 (i.e. a volume of fuel not required for the immediate engine operation) from the fuel tank 14. The excess fuel 26 pumped through the engine transfer pump 18 is recirculated back to the fuel tank 14 by way of the fuel recirculation bypass conduit 20 and the fuel recirculation check valve 22. Preferably, the capacity or output of the engine transfer pump 18, in the illustrated embodiment, is generally equivalent to at least $1/24$ of the volume of the tank per hour or such capacity sufficient to supply the required fuel 26 to the engine 12 and recirculate the remaining volume of fuel 26 in the fuel tank 14 every 24 hours.

As indicated above, the fuel recirculation system 10 is most beneficial when used in conjunction with an internal combustion engine 12 adapted to use an aqueous fuel emulsion. This is because aqueous fuel emulsions tend to destabilize or separate over time into a water phase and a hydrocarbon phase. Fuel recirculation and agitation is needed to ensure the proper fuel mixture is combusted to sustain optimum engine performance.

Unlike many existing fuel delivery systems, the fuel 26 from the fuel return conduit 25 is preferably returned to the fuel tank 14 at a location near a central or intermediate elevation of the fuel tank 14 in order to reemulsify the fuel and prevent air entrapment in the emulsion (i.e. reduce the aeration of the fuel supply). The discharge head 32 of the fuel return conduit 25 is sufficient to ensure that the recirculated and/or returned fuel 26 is agitated and thus, reemulsified.

Another embodiment of the fuel recirculation system is illustrated in FIG. 2. This embodiment is particularly suitable for use in retrofitting engines not originally designed to use an aqueous fuel emulsion. Many existing engines having an engine transfer pump 18 of a prescribed capacity that is otherwise not sufficient to recirculate the entire fuel emulsion volume in the fuel tank 14. To address this concern, the illustrated embodiment employs an additional fuel boost pump 38 disposed along the fuel feed line 16 upstream of the engine transfer pump 18 and fuel recirculation bypass conduit 20.

As seen in FIG. 2, the illustrated embodiment of the fuel recirculation system 10 is very similar to the embodiment described with reference to FIG. 1 in that it includes the fuel tank 14, fuel feed line 16, engine transfer pump 18, fuel recirculation bypass conduit 20, fuel recirculation check valve 22, and a fuel return conduit 25. The illustrated fuel recirculation system 10 is also operatively associated with an internal combustion engine 12 which preferably includes a fuel delivery device such as a plurality of fuel injectors 30 adapted to provide a prescribed volume of fuel 26 to the engine cylinders for combustion. As depicted by the dashed lines, the fuel return conduit 25 may be adapted to return the unused fuel from the engine 12 back to the fuel tank 14 or alternatively back to the engine 12. The illustrated embodiment of the fuel recirculation system 10 also employs a fuel boost pump 38 which, together with the fuel recirculation bypass conduit 20, is located upstream of the engine transfer pump 18.

In the illustrated embodiment, the fuel 26 residing within the fuel tank 14 is transported via the fuel feed line 16 to the fuel boost pump 38 which is sized to supply the prescribed volume of fuel 26 to the engine 12 via the engine transfer pump 18 and enough excess fuel to recirculate the entire volume of fuel 26 in the fuel tank 14 once a day (i.e. at least $1/24$ of the volume of the fuel tank per hour). The excess fuel supplied by the fuel boost pump 38 not required by the engine transfer pump 18 and engine 12 is diverted through the fuel recirculation bypass conduit 20 and the fuel recirculation check valve 22 to the fuel return conduit 25 and back to the fuel tank 14. The fuel recirculation bypass conduit 20 and the fuel recirculation check valve 22 are disposed in fluid communication with the fuel feed line 16 and interposed between the fuel boost pump 38 and the engine transfer pump 18. The fuel recirculation check valve 22 is adapted to regulate the fuel pressure to the engine transfer pump 18.

As described above, the fuel 26 from the fuel tank 14 is preferably delivered from the lower or bottom elevation of the fuel tank 14. Any excess fuel 26 not injected by the fuel injectors 30 into the engine cylinders is returned to the fuel tank 14 via a fuel return conduit 25. The fuel 26 in the fuel return conduit 25 is preferably returned to the fuel tank 14 at a location near a central or intermediate elevation of the fuel tank 14 in order to prevent air entrapment in the emulsion.

From the foregoing, it should be appreciated that the above-disclosed embodiments of the fuel recirculation system provide the ability to prevent separation of an aqueous fuel emulsion in a fuel tank concurrent with the delivery of fuel to the engine. While the invention herein disclosed has been described by means of specific embodiments, numerous modifications and variations can be made thereto by those skilled in the art without departing from the scope of the invention or sacrificing all its material advantages.

What is claimed is:

1. A fuel recirculation system for an internal combustion engine comprising:

a fuel tank;

a fuel delivery circuit in fluid communication with said fuel tank and said engine and adapted for transporting fuel therebetween;

a fuel recirculation circuit having a first end and a second end, said first end coupled with said fuel delivery circuit outside said fuel tank and upstream of said engine, and said second end of said fuel recirculation circuit is in fluid communication with a central elevation of said fuel tank in order to reduce the aeration of the fuel supply; and a fuel pump for circulating fuel through said fuel delivery circuit and through said recirculation circuit.

2. The fuel recirculation system of claim 1 wherein a second end of said fuel recirculation circuit is coupled with said fuel delivery circuit downstream of said engine.

3. The fuel recirculation system of claim 1 wherein a second end of said fuel recirculation circuit is coupled with said fuel tank.

4. The fuel recirculation system of claim 1 further comprising an aqueous fuel emulsion disposed in said fuel tank.

5. The fuel recirculation system of claim 1 wherein said fuel delivery circuit is in fluid communication with a lower elevation of said fuel tank.

6. The fuel recirculation system of claim 1 wherein said fuel recirculation circuit further including a check valve disposed in operative association with said recirculation conduit allowing flow from said first end.

7. The fuel recirculation system of claim 6 wherein said fuel delivery circuit further includes:
   a fuel line connecting said fuel tank and said engine and adapted for transporting fuel from said fuel tank to said engine; and
   a fuel return line disposed between said engine and said tank adapted for returning unused fuel from said engine to said fuel tank.

8. The fuel recirculation system of claim 7 wherein said fuel return line is in fluid communication with a central elevation of said fuel tank.

9. The fuel recirculation system of claim 6 wherein said fuel delivery circuit further includes:
   a fuel line connecting said fuel tank and said engine and adapted for transporting fuel from said fuel tank to said engine; and
   a fuel return line connected to said engine and adapted for returning unused fuel back to said fuel line.

10. The fuel recirculation system of claim 6 wherein said fuel delivery circuit further includes a second fuel pump disposed downstream of said first end of said fuel recirculation circuit, said second fuel pump adapted to supply a prescribed volume of fuel to said engine.

11. The fuel recirculation system of claim 10 wherein said fuel delivery pressure to the second fuel pump is regulated by said check valve.

12. A fuel recirculation system for an internal combustion engine comprising:
   a fuel tank;
   a fuel delivery circuit in fluid communication with said fuel tank and said engine and adapted for transporting fuel therebetween;
   a fuel recirculation circuit having a first end coupled with said fuel delivery circuit outside said fuel tank and upstream of said engine;
   a first fuel pump for circulating fuel through said fuel delivery circuit and through said recirculation circuit; and
   a second fuel pump disposed downstream of said first end of said fuel recirculation circuit, said second fuel pump adapted to supply a prescribed volume of fuel to said engine.

13. The fuel recirculation system of claim 12 wherein said fuel recirculation circuit further including a check valve disposed in operative association with said recirculation conduit allowing flow from said first end.

14. The fuel recirculation system of claim 13 wherein said fuel delivery pressure to said second fuel pump is regulated by said check valve.

15. The fuel recirculation system of claim 12 wherein a second end of said fuel recirculation circuit is coupled with said fuel tank.

16. The fuel recirculation system of claim 15 wherein said second end of said fuel recirculation circuit is in fluid communication with a central elevation of said fuel tank.

17. The fuel recirculation system of claim 12 further comprising an aqueous fuel emulsion disposed in said fuel tank.

18. The fuel recirculation system of claim 12 wherein said fuel delivery circuit is in fluid communication with a lower elevation of said fuel tank.

* * * * *